United States Patent
Ueno (10) Patent No.: US 9,411,351 B2
(45) Date of Patent: Aug. 9, 2016

(54) DC-TO-DC CONVERTER

(71) Applicant: KABUSHIKI KAISHA TOSHIBA, Minato-ku, Tokyo (JP)

(72) Inventor: Takeshi Ueno, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/673,220

(22) Filed: Mar. 30, 2015

(65) Prior Publication Data
US 2015/0355654 A1 Dec. 10, 2015

(30) Foreign Application Priority Data
Jun. 9, 2014 (JP) ................. 2014-118911

(51) Int. Cl.
*G05F 1/575* (2006.01)
*H02M 3/155* (2006.01)
*H02M 3/156* (2006.01)
*H02M 1/00* (2006.01)

(52) U.S. Cl.
CPC ............... *G05F 1/575* (2013.01); *H02M 3/156* (2013.01); *H02M 2001/0025* (2013.01)

(58) Field of Classification Search
CPC .......... G05F 1/575; G05F 1/468; G05F 1/56; H02M 3/155; H02M 3/157
USPC .................. 323/273, 280, 281, 282, 283, 351
See application file for complete search history.

(56) References Cited

U.S. PATENT DOCUMENTS

| | | | | |
|---|---|---|---|---|
| 7,609,042 B2* | 10/2009 | Kokubun | ............ | H02M 3/1588 323/274 |
| 8,890,493 B2* | 11/2014 | Isik | ......... | H02M 3/07 307/66 |
| 2004/0207375 A1* | 10/2004 | Umemoto | ............. | H02M 3/156 323/282 |
| 2011/0181258 A1* | 7/2011 | Ivanov | .................... | G05F 1/575 323/282 |
| 2012/0091981 A1* | 4/2012 | Komiya | ................ | H02M 3/156 323/282 |
| 2012/0146514 A1* | 6/2012 | Jeong | .................. | H05B 33/083 315/122 |
| 2013/0063106 A1* | 3/2013 | Nishida | ................. | H02M 3/156 323/271 |
| 2014/0266414 A1* | 9/2014 | Kim | ........................ | G05F 1/468 327/543 |

OTHER PUBLICATIONS

Ultralow Voltage Step-Up Converter and Power Manager, Linear Technology Datasheet 2009.

* cited by examiner

*Primary Examiner* — Adolf Berhane
(74) *Attorney, Agent, or Firm* — Holtz, Holtz & Volek PC (57) ABSTRACT

According to an embodiment, a direct current to direct current (DC-to-DC) converter includes a power stage, a generating circuit, a voltage dividing circuit, a subtractor and a controller. The power stage converts an input voltage to a first output voltage. The generating circuit generates a reference voltage by selecting one of candidate voltages in accordance with a level of the first output voltage. The voltage dividing circuit divides the first output voltage to obtain a second output voltage. The subtractor calculates a differential voltage between the reference voltage and the second output voltage. The control circuit generates a control signal to control the level of the first output voltage based on the differential voltage.

11 Claims, 5 Drawing Sheets

DC-TO-DC CONVERTER

CROSS-REFERENCE TO RELATED APPLICATIONS

This application is based upon and claims the benefit of priority from Japanese Patent Application No. 2014-118911, filed Jun. 9, 2014, the entire contents of which are incorporated herein by reference.

FIELD

The embodiment relates to a direct current (DC) to direct current (DC) conversion.

BACKGROUND

DC-to-DC converters convert an DC input voltage to a DC output voltage of a different amount. The DC output voltage is compared with a reference voltage to perform switching control based on the comparison results. This stabilizes the DC output voltage at a desired level. In general, a reference voltage is generated by a reference voltage source. The reference voltage source is typically driven by the DC output voltage.

For example, the technology can apply to charging a capacitor, a secondary battery or the like by applying to a DC-to-DC converter a minute voltage generated by a solar battery or thermo-element as a DC input voltage, and converting the DC input voltage to a DC output voltage by the DC-to-DC converter. However, the DC-to-DC converters may fail to apply a driving voltage with a level sufficient for the reference voltage source to initiate an operation. In this case, the operation of DC-to-DC converters may be unstable since they cannot use a required reference voltage.

DETAILED DESCRIPTION

Embodiments will be described hereinafter with reference to drawings.

According to an embodiment, a direct current to direct current (DC-to-DC) converter includes a power stage, a generating circuit, a voltage dividing circuit, a subtractor and a controller. The power stage converts an input voltage to a first output voltage. The generating circuit generates a reference voltage by selecting one of candidate voltages in accordance with a level of the first output voltage. The voltage dividing circuit divides the first output voltage to obtain a second output voltage. The subtractor calculates a differential voltage between the reference voltage and the second output voltage. The control circuit generates a control signal to control the level of the first output voltage based on the differential voltage.

In the drawings, the same constituent elements are denoted by the same respective reference numbers. Redundant explanation will be avoided.

First Embodiment

Figure 1:
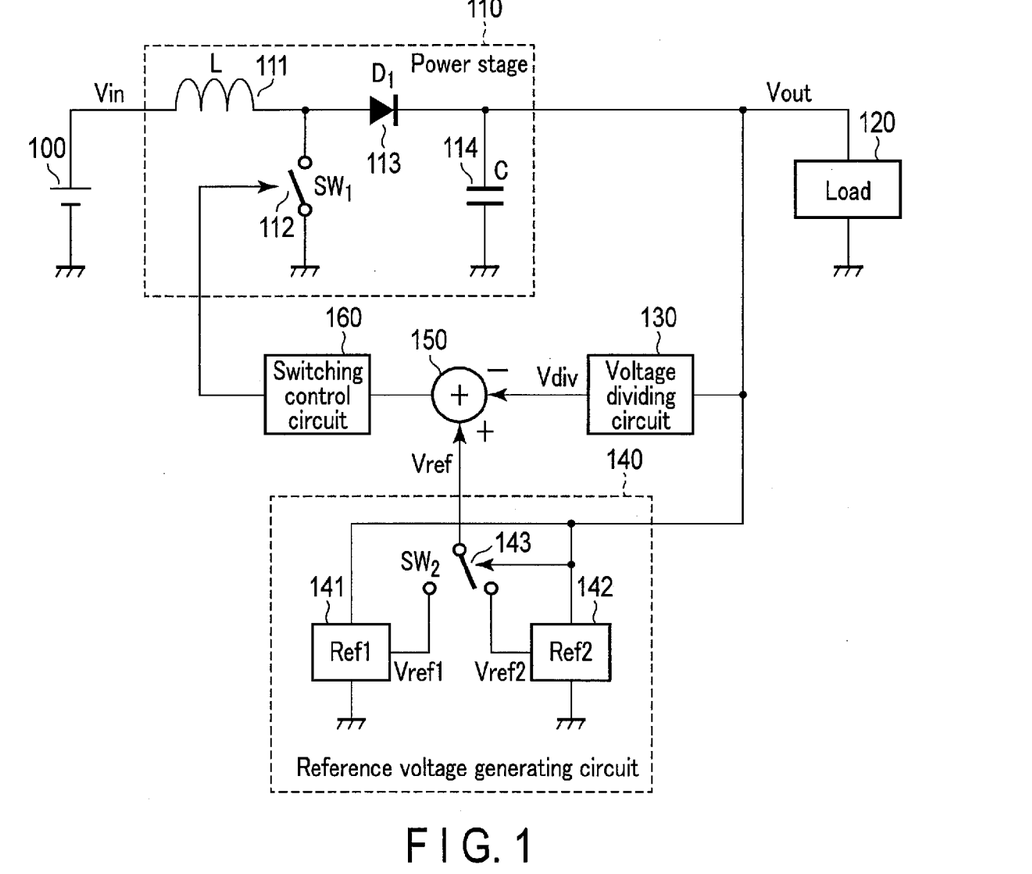
FIG. 1 is a block diagram illustrating a DC-to-DC converter according to the first embodiment.

As shown in FIG. 1, a DC-to-DC converter according to the first embodiment includes a power stage 110, a voltage dividing circuit 130, a reference voltage generating circuit 140, a subtractor 150, and a switching control circuit 160. The DC-to-DC converter converts an input voltage ($V_{in}$) applied by a voltage source 100 to an output voltage ($V_{out}$), and applies the output voltage ($V_{out}$) to a load 120. The DC-to-DC converter shown in FIG. 1 is for increasing the voltage (i.e., $V_{in} < V_{out}$), but may be used for decreasing the voltage (i.e., $V_{in} > V_{out}$).

The voltage source 100 includes a positive terminal and a negative terminal. The positive terminal of the voltage source 100 is connected to an input terminal of the DC-to-DC converter (i.e., an input terminal of the power stage 110). The negative terminal of the voltage source 100 is grounded. The voltage source 100 generates an input voltage ($V_{in}$), and applies the input voltage ($V_{in}$) to the DC-to-DC converter.

The load 120 may be any load. The load 120 is connected to an output terminal of the DC-to-DC converter (i.e., an output terminal of the power stage 110). The load 120 may be a secondary battery or an electronic device.

The power stage 110 includes an input terminal, a control terminal and an output terminal. The input terminal of the power stage 110 functions as an input terminal of the DC-to-DC converter, and is connected to the positive terminal of the voltage source 100. The control terminal of the power stage 110 is connected to an output terminal of the switching control circuit 160. The output terminal of the power stage 110 functions as an output terminal of the DC-to-DC converter, and is connected in common to the load 120, an input terminal of the voltage dividing circuit 130, and a control terminal of the reference voltage generating circuit 140. The power stage 110 converts an input voltage ($V_{in}$) to an output voltage ($V_{out}$).

Specifically, the power stage 110 includes an inductor 111 (L), a switch 112 ($SW_1$), a diode 113 ($D_1$) and a capacitor 114 (C).

The inductor 111 (L) includes a first terminal and a second terminal. The first terminal of the inductor 111 (L) functions as an input terminal of the power stage 110. The second terminal of the inductor 111 (L) is connected to the switch 112 ($SW_1$) and an anode of the diode 113 ($D_1$).

The inductor 111 (L) stores magnetic energy by a current flowing through the inductor 111 (L) while the switch 112 ($SW_1$) is in an ON state. The inductor 111 (L) discharges the stored magnetic energy as an electric energy while the switch 112 ($SW_1$) is in an OFF state.

The switch 112 ($SW_1$) includes a control terminal which functions as a control terminal of the power stage 110. The switch 112 ($SW_1$) receives a switch control signal through the control terminal from the switching control circuit 160, and performs ON/OFF operation in response to the switch control signal. Specifically, the switch 112 ($SW_1$) short-circuits or opens between the second terminal of the inductor 111 (L), the anode of the diode 113 ($D_1$), and the ground.

The diode 113 ($D_1$) includes an anode and a cathode. The anode of the diode 113 ($D_1$) is connected to both of the second terminal of the inductor 111 (L) and the switch 112 (SW$_1$). The cathode of the diode 113 (D$_1$) is connected to a first terminal of the capacitor 114 (C).

The diode 113 (D$_1$) allows a current supplied from the inductor 111 to flow into the capacitor 114 (C) after the switch 112 (SW$_1$) is switched to an OFF state from an ON state. The diode 113 (D$_1$) prevents a current from flowing back to the voltage source 100 from the capacitor 114 (C).

The capacitor 114 (C) includes a first terminal and a second terminal. The first terminal of the capacitor 114 (C) functions as the output terminal of the power stage 110, and is connected in common to the cathode of the diode 113 (D$_1$), the load 120, the input terminal of the voltage dividing circuit 130, and the control terminal of the reference voltage generating circuit 140. The second terminal of the capacitor 114 (C) is grounded. The capacitor 114 (C) is charged by a current supplied from the diode 113 (D$_1$) after the switch 112 (SW$_1$) is switched to the OFF state from the ON state. Accordingly, the voltage (V$_{out}$) of the first terminal of the capacitor 114 (C) increase. On the other hand, if current supply from the diode 113 (D$_1$) is stopped, the capacitor 114 (C) discharges. Accordingly, the voltage (V$_{out}$) of the first terminal of the capacitor 114 (C) decreases.

The voltage dividing circuit 130 includes an input terminal and an output terminal. The input terminal of the voltage dividing circuit 130 is connected in common to the output terminal of the power stage 110, the load 120, and the control terminal of the reference voltage generating circuit 140. The output terminal of the voltage dividing circuit 130 is connected to an inverted input terminal of the subtractor 150.

The voltage dividing circuit 130 divides the input voltage (V$_{out}$) by a predetermined voltage division ratio (N) to obtain an output voltage (V$_{div}$). The voltage dividing circuit 130 applies the output voltage (V$_{div}$) to the inverted input terminal of the subtractor 150. If the voltage division ratio (N) is 1, the voltage dividing circuit 130 can be omitted. The following equation (1) is given for the input voltage (V$_{out}$) and the output voltage (V$_{div}$) of the voltage dividing circuit 130:

$$V_{div} = V_{out}/N \quad (1)$$

The reference voltage generating circuit 140 includes a control terminal and an output terminal. The control terminal of the reference voltage generating circuit 140 is connected in common to the output terminal of the power stage 110, the load 120, and the input terminal of the voltage dividing circuit 130. The output terminal of the reference voltage generating circuit 140 is connected to a non-inverted input terminal of the subtractor 150.

The reference voltage generating circuit 140 generates a reference voltage (V$_{ref}$) in accordance with the voltage to be applied to the control terminal. The reference voltage generating circuit 140 applies the reference voltage (V$_{ref}$) to the non-inverted input terminal of the subtractor 150.

The subtractor 150 includes the non-inverted input terminal, inverted input terminal, and output terminal. The non-inverted input terminal of the subtractor 150 is connected to the output terminal of the reference voltage generating circuit 140. The inverted input terminal of the subtractor 150 is connected to the output terminal of the voltage dividing circuit 130. The output terminal of the subtractor 150 is connected to the input terminal of the switching control circuit 160.

The subtractor 150 subtracts the voltage of the inverted input terminal (V$_{div}$) from the voltage of the non-inverted input terminal (V$_{ref}$). The subtractor 150 outputs a difference signal indicating a sign (positive or negative) of a differential voltage to the switching control circuit 160.

The switching control circuit 160 includes the input terminal and the output terminal. The input terminal of the switching control circuit 160 is connected to the output terminal of the subtractor 150. The output terminal of the switching control circuit 160 is connected to the control terminal of the power stage 110.

The switching control circuit 160 receives a difference signal from the subtractor 150. The switching control circuit 160 generates a switching control signal based on the difference signal. The switching control circuit 160 outputs the switching control signal to the power stage 110. Specifically, if the difference signal represents a positive sign (i.e., V$_{ref}$≥V$_{div}$), the switching control circuit 160 generates a switching control signal to periodically switch ON and OFF states of the switch 112 (SW$_1$). The output voltage (V$_{out}$) of the power stage 110 increases in accordance with the switching control signal. On the other hand, if the difference signal represents a negative sign (i.e., V$_{ref}$<V$_{div}$), the switching control circuit 160 generates a switching control signal so that the switch 112 (SW$_1$) remains in the OFF state. The output voltage (V$_{out}$) of the power stage 110 consequently decreases in accordance with the switching control signal.

In other words, negative feedback control is performed to satisfy the following equation (2):

$$V_{div} = V_{ref} \quad (2)$$

The equation (2) can be rewritten as the following equation (3) regarding the output voltage (V$_{out}$) of the power stage 110:

$$V_{out} = N \cdot V_{ref} \quad (3)$$

The reference voltage generating circuit 140 selects a first candidate voltage (V$_{ref1}$) as the reference voltage (V$_{ref}$) in a first phase where the output voltage (V$_{out}$) of the power stage 110 is lower than a first threshold voltage (V$_{th}$). On the other hand, the reference voltage generating circuit 140 selects a second candidate voltage (V$_{ref2}$) as the reference voltage (V$_{ref}$) in a second phase where the output voltage (V$_{out}$) of the power stage 110 is equal to or greater than the first threshold voltage (V$_{th}$).

That is, the reference voltage (V$_{ref}$) is given as follows:

$$\begin{cases} V_{ref} = V_{ref1} \text{ if } V_{out} < V_{th} \\ V_{ref} = V_{ref2} \text{ if } V_{out} \geq V_{th} \end{cases} \quad (4)$$

In FIG. 1, the reference voltage generating circuit 140 includes a reference voltage source 141, a reference voltage source 142 and a switch 143 (SW$_2$).

The reference voltage source 141 is driven by the output voltage (V$_{out}$) of the power stage 110, and generates the first candidate voltage (V$_{ref1}$). The first candidate voltage (V$_{ref1}$) is set to be equal to or greater than the output voltage (V$_{div}$) of the voltage dividing circuit 130 in the first phase. For example, the first candidate voltage (V$_{ref1}$) may be the output voltage (V$_{out}$) of the power stage 110 itself or be generated by dividing the output voltage (V$_{out}$) by a voltage division ratio smaller than N.

The reference voltage source 142 is driven by the output voltage (V$_{out}$) of the power stage 110, and generates the second candidate voltage (V$_{ref2}$). For example, the reference voltage source 142 may be implemented by using a band gap reference (BGR) circuit. The second candidate voltage (V$_{ref2}$) has a stable level regardless of change in the output voltage (V$_{out}$) of the power stage 110 in the second phase. In other words, the first threshold voltage (V$_{th}$) is set to be a level equal to or greater than the lower limit of a driving voltage so that the reference voltage source 142 operates normally (i.e., the level of the second candidate voltage ($V_{ref2}$) is stable).

The switch 143 ($SW_2$) selects one of the first candidate voltage ($V_{ref1}$) and the second candidate voltage ($V_{ref2}$) as the reference voltage ($V_{ref}$) depending on the level of the output voltage ($V_{out}$) of the power stage 110. Specifically, the switch 143 ($SW_2$) selects the first candidate voltage ($V_{ref1}$) if the output voltage ($V_{out}$) of the power stage 110 is lower than the first threshold voltage ($V_{th}$). On the other hand, the switch 143 ($SW_2$) selects the second candidate voltage ($V_{ref2}$) if the output voltage ($V_{out}$) of the power stage 110 is equal to or greater than the first threshold voltage ($V_{th}$).

Figure 2:
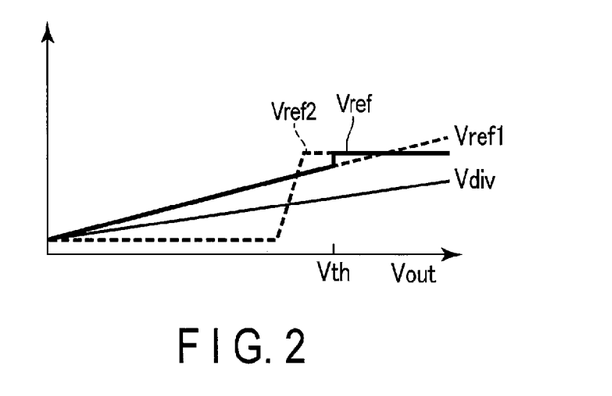
FIG. 2 is a graph illustrating a voltage of each node shown in FIG. 1.

FIG. 2 shows the relation between the output voltage ($V_{out}$) of the power stage 110 and the reference voltage ($V_{ref}$). When the output voltage ($V_{out}$) of the power stage 110 is greatly lower than the first threshold voltage ($V_{th}$), the reference voltage source 142 cannot operate normally, and the level of the second candidate voltage ($V_{ref2}$) is extremely low. If the second candidate voltage ($V_{ref2}$) the level of which is extremely low is used as the reference voltage ($V_{ref}$), the condition of $V_{ref} \leq V_{div}$ is always true, and the output voltage ($V_{out}$) of the power stage 110 cannot increase to a desired level.

Thus, as stated above, the reference voltage generating circuit 140 selects the first candidate voltage ($V_{ref1}$) as the reference voltage ($V_{ref}$) in the first phase where the output voltage ($V_{out}$) of the power stage 110 is lower than the first threshold voltage ($V_{th}$). The first candidate voltage ($V_{ref1}$) is set to be equal to or greater than the output voltage ($V_{div}$) of the voltage dividing circuit 130 in the first phase. In this case, if the first candidate voltage ($V_{ref1}$) is used as the reference voltage ($V_{ref}$), the output voltage ($V_{out}$) of the power stage 110 can increase to a level sufficient for the reference voltage source 142 to operate normally.

In addition, as stated above, the second candidate voltage ($V_{ref2}$) is selected as the reference voltage ($V_{ref}$) in the second phase where the output voltage ($V_{out}$) of the power stage 110 is equal to or greater than the first threshold voltage ($V_{th}$). The second candidate voltage ($V_{ref2}$) has a stable level regardless of change in the output voltage ($V_{out}$) of the power stage 110 in the second phase. Accordingly, output voltage ($V_{out}$) of the power stage 110 can be stabilized through the negative feedback control.

As stated above, the DC-to-DC converter according to the first embodiment adaptively selects a reference voltage from among a plurality of candidate voltages having different characteristics. This DC-to-DC converter ensures stable operation even if the level of DC output voltage is minute.

Second Embodiment

Figure 3:
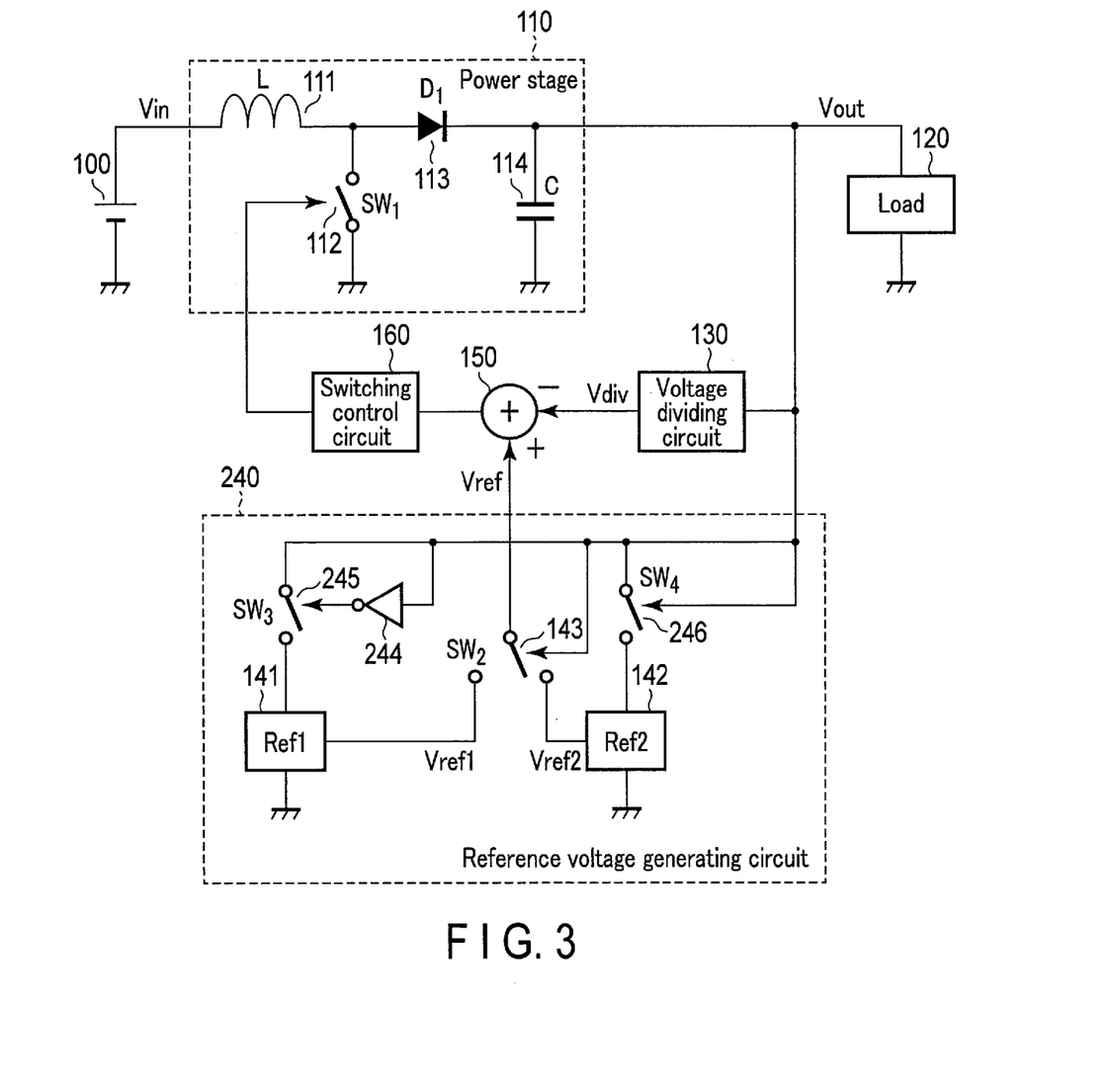
FIG. 3 is a block diagram illustrating a DC-to-DC converter according to the second embodiment.

As shown in FIG. 3, a DC-to-DC converter according to the second embodiment includes the power stage 110, the voltage dividing circuit 130, a reference voltage generating circuit 240, the subtractor 150, and the switching control circuit 160. The DC-to-DC converter converts an input voltage ($V_{in}$) applied by a voltage source 100 to an output voltage ($V_{out}$), and applies the output voltage ($V_{out}$) to the load 120.

The voltage source 100, power stage 110, load 120, voltage dividing circuit 130, subtractor 150 and switching control circuit 160 shown in FIG. 3 may be the same as or similar to the voltage source 100, power stage 110, load 120, voltage dividing circuit 130, subtractor 150 and switching control circuit 160 shown in FIG. 1. The DC-to-DC converter shown in FIG. 3 is for increasing the voltage (i.e., $V_{in} < V_{out}$), but may be used for decreasing the voltage (i.e., $V_{in} > V_{out}$).

The reference voltage generating circuit 240 includes a control terminal and an output terminal. The control terminal of the reference voltage generating circuit 240 is connected in common to the output terminal of the power stage 110, the load 120, and the input terminal of the voltage dividing circuit 130. The output terminal of the reference voltage generating circuit 240 is connected to the non-inverted input terminal of the subtractor 150.

The reference voltage generating circuit 240 generates a reference voltage ($V_{ref}$) in accordance with the voltage to be applied to the control terminal. The reference voltage generating circuit 240 applies the reference voltage ($V_{ref}$) to the non-inverted input terminal of the subtractor 150.

The reference voltage generating circuit 240 selects a first candidate voltage ($V_{ref1}$) as the reference voltage ($V_{ref}$) in the aforementioned first phase. On the other hand, the reference voltage generating circuit 240 selects a second candidate voltage ($V_{ref2}$) as the reference voltage ($V_{ref}$) in the aforementioned second phase.

In FIG. 3, the reference voltage generating circuit 240 includes the reference voltage source 141, the reference voltage source 142, the switch 143 ($SW_2$), an inverter 244, a switch 245 ($SW_3$) and a switch 246 ($SW_4$). The reference voltage source 141, reference voltage source 142, and switch 143 ($SW_2$) may be the same as or similar to the reference voltage source 141, reference voltage source 142 and switch 143 ($SW_2$) shown in FIG. 1.

The inverter 244 includes an input terminal and an output terminal. The input terminal of the inverter 244 is connected to a control terminal of the reference voltage generating circuit 240. The output terminal of the inverter 244 is connected to a control terminal of the switch 245 ($SW_3$). The inverter 244 performs logical inversion on the output voltage ($V_{out}$) of the power stage 110.

The switch 245 ($SW_3$) includes the control terminal. The output voltage of the inverter 244 is applied to the control terminal of the switch 245 ($SW_3$), and the switch 245 ($SW_3$) is switched between the ON and OFF states in accordance with the output voltage. Specifically, the switch 245 ($SW_3$) short-circuits between the control terminal of the reference voltage generating circuit 240 and the reference voltage source 141 in the first phase. On the other hand, the switch 245 ($SW_3$) opens between the control terminal of the reference voltage generating circuit 240 and the reference voltage source 141 in the second phase. That is, the switch 245 ($SW_3$) stops supply of a driving voltage to the reference voltage source 141 while the first candidate voltage ($V_{ref1}$) is not selected as the reference voltage ($V_{ref}$).

The switch 246 ($SW_4$) includes a control terminal. The output voltage ($V_{out}$) of the power stage 110 is applied to the control terminal of the switch 246 ($SW_4$), and the switch 246 ($SW_4$) is switched between the ON and OFF states in accordance with the output voltage ($V_{out}$). Specifically, the switch 246 ($SW_4$) opens between the control terminal of the reference voltage generating circuit 240 and the reference voltage source 142 in the first phase. That is, the switch 246 ($SW_4$) stops supply of a driving voltage to the reference voltage source 142 while the second candidate voltage ($V_{ref2}$) is not selected as the reference voltage ($V_{ref}$). On the other hand, the switch 246 ($SW_4$) short-circuits between the control terminal of the reference voltage generating circuit 240 and the reference voltage source 142 in the second phase.

As stated above, the DC-to-DC converter according to the second embodiment stops supply of a driving voltage to a specific candidate voltage while the specific candidate voltage is not selected as a reference voltage. Accordingly, this DC-to-DC converter reduces unnecessary current consumption in the reference voltage source to generate candidate voltages. That is, this DC-to-DC converter reduces current consumption and achieves high speed charging for a capacitor included in the power stage.

Third Embodiment

Figure 4:
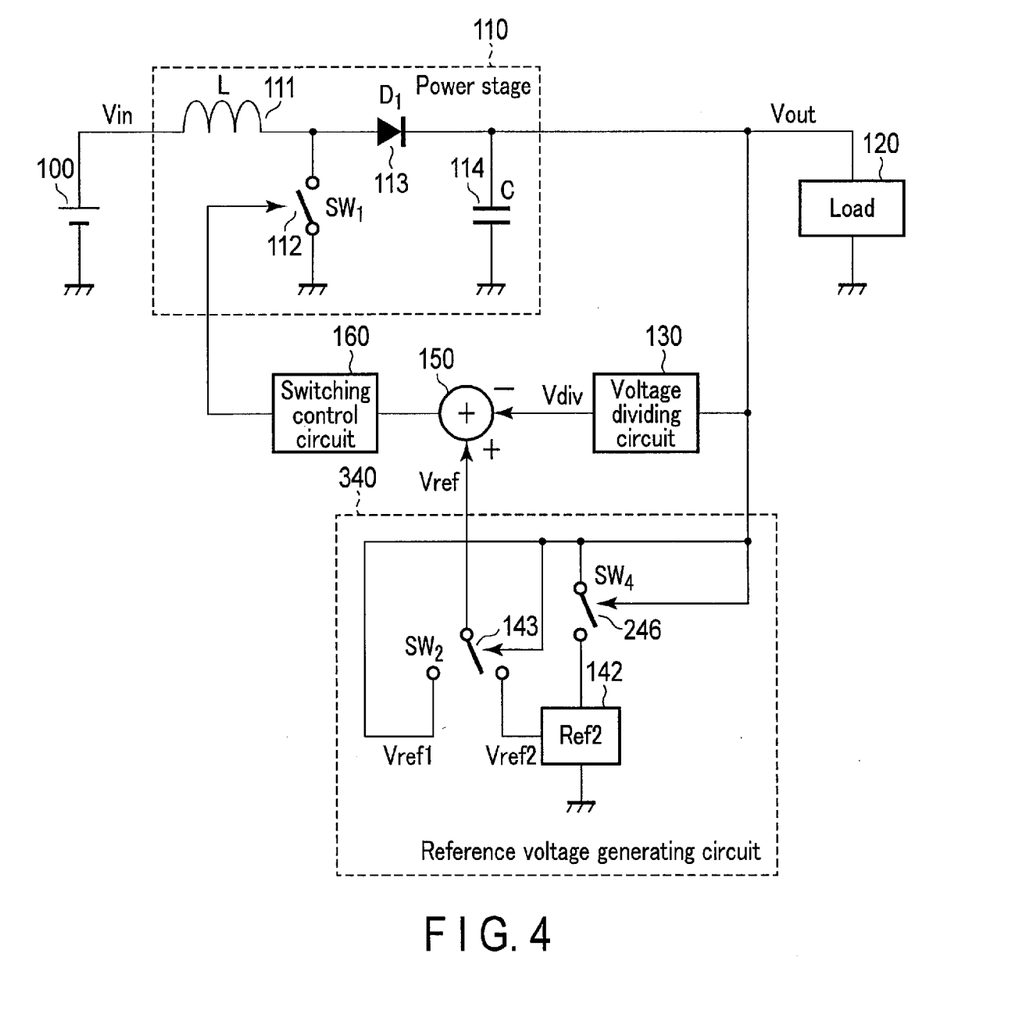
FIG. 4 is a block diagram illustrating a DC-to-DC converter according to the third embodiment.

As shown in FIG. 4, a DC-to-DC converter according to the third embodiment includes the power stage 110, the voltage dividing circuit 130, a reference voltage generating circuit 340, the subtractor 150, and the switching control circuit 160. The DC-to-DC converter converts an input voltage ($V_{in}$) applied by a voltage source 100 to an output voltage ($V_{out}$), and applies the output voltage ($V_{out}$) to the load 120.

The voltage source 100, power stage 110, load 120, voltage dividing circuit 130, subtractor 150 and switching control circuit 160 shown in FIG. 4 may be the same as or similar to the voltage source 100, power stage 110, load 120, voltage dividing circuit 130, subtractor 150 and switching control circuit 160 shown in FIG. 3. The DC-to-DC converter shown in FIG. 4 is for increasing the voltage (i.e., $V_{in}<V_{out}$), but may be used for decreasing the voltage (i.e., $V_{in}>V_{out}$).

The reference voltage generating circuit 340 includes a control terminal and an output terminal. The control terminal of the reference voltage generating circuit 340 is connected in common to the output terminal of the power stage 110, the load 120, and the input terminal of the voltage dividing circuit 130. The output terminal of the reference voltage generating circuit 340 is connected to the non-inverted input terminal of the subtractor 150.

The reference voltage generating circuit 340 generates a reference voltage ($V_{ref}$) in accordance with the voltage to be applied to the control terminal. The reference voltage generating circuit 340 applies the reference voltage ($V_{ref}$) to the non-inverted input terminal of the subtractor 150.

The reference voltage generating circuit 340 selects a first candidate voltage ($V_{ref1}$) as the reference voltage ($V_{ref}$) in the aforementioned first phase. The first candidate voltage ($V_{ref1}$) is the output voltage ($V_{out}$) of the power stage 110. On the other hand, the reference voltage generating circuit 340 selects the second candidate voltage ($V_{ref2}$) as the reference voltage ($V_{ref}$) in the aforementioned second phase.

In FIG. 4, the reference voltage generating circuit 340 includes the reference voltage source 142, the switch 143 (SW$_2$) and the switch 246 (SW$_4$). The reference voltage source 142, switch 143 (SW$_2$) and switch 246 (SW$_4$) may be the same as or similar to the reference voltage source 142, switch 143 (SW$_2$) and switch 246 (SW$_4$) shown in FIG. 3. Since the reference voltage generating circuit 340 uses the output voltage ($V_{out}$) of the power stage 110 as the first candidate voltage ($V_{ref1}$), an element having a function corresponding to the reference voltage source 141 is not necessary. Since the condition where $V_{ref1}=V_{out}>V_{div}$ is always true, the first candidate voltage ($V_{ref1}$) is greater than the output voltage ($V_{div}$) of the voltage dividing circuit 130 in the first phase.

As stated above, the DC-to-DC converter according to the third embodiment uses the output voltage of the DC-to-DC converter as a specific candidate voltage. This DC-to-DC converter eliminates the need for providing a reference voltage source to generate the specific candidate voltage, thereby achieving simplification of the configuration and reduction of current consumption.

Fourth Embodiment

Figure 5:
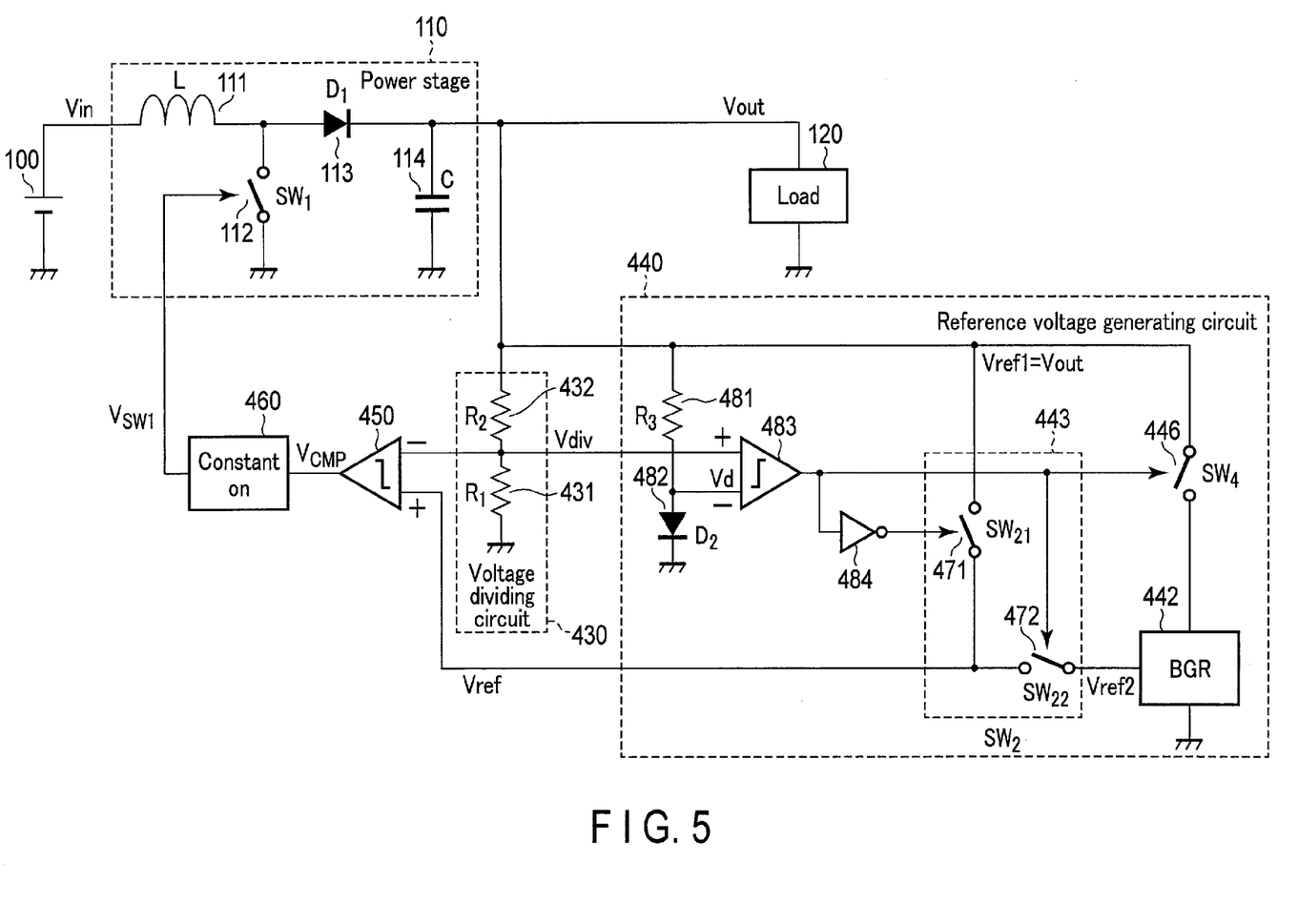
FIG. 5 is a block diagram illustrating a DC-to-DC converter according to the fourth embodiment.

As shown in FIG. 5, a DC-to-DC converter according to the fourth embodiment includes the power stage 110, a voltage dividing circuit 430, a voltage dividing circuit 430, a reference voltage generating circuit 440, a subtractor 450, and a switching control circuit 460. The DC-to-DC converter converts an input voltage ($V_{in}$) applied by the voltage source 100 to an output voltage ($V_{out}$), and applies the output voltage ($V_{out}$) to the load 120.

The voltage source 100, power stage 110, and load 120 shown in FIG. 5 may be the same as or similar to the voltage source 100, power stage 110, and load 120 shown in FIG. 4. The DC-to-DC converter shown in FIG. 5 is for increasing the voltage (i.e., $V_{in}<V_{out}$), but may be used for decreasing the voltage (i.e., $V_{in}>V_{out}$).

The voltage dividing circuit 430 includes an input terminal and an output terminal. The input terminal of the voltage dividing circuit 430 is connected in common to the output terminal of the power stage 110, the load 120, and a first control terminal of the reference voltage generating circuit 440. The output terminal of the voltage dividing circuit 430 is connected to both of a second control terminal of the reference voltage generating circuit 440 and an inverted input terminal of the subtractor 450.

The voltage dividing circuit 430 divides the input voltage ($V_{out}$) by a predetermined voltage division ratio (N) to obtain an output voltage ($V_{div}$). The voltage dividing circuit 430 applies the output voltage ($V_{div}$) to the second control terminal of the reference voltage generating circuit 440 and the inverted input terminal of the subtractor 450.

Specifically, the voltage dividing circuit 430 includes a resistor 431 ($R_1$) and a resistor 432 ($R_2$).

A first terminal of the resistor 431 ($R_1$) functions as the output terminal of the voltage dividing circuit 430 and is connected to a second terminal of the resistor 431 ($R_1$). The second terminal of the resistor 431 (RD is grounded.

The first terminal of the resistor 432 ($R_2$) functions as the input terminal of the voltage dividing circuit 430. The second terminal of the resistor 432 ($R_2$) functions as the output terminal of the voltage dividing circuit 430 and is connected to the first terminal of the resistor 432 ($R_2$). That is, the resistor 431 ($R_1$) and the resistor 432 ($R_2$) are connected in series.

The voltage division ratio (N) of the voltage dividing circuit 430 depends on a resistance ($R_1$) of the resistor 431 and a resistance ($R_2$) of the resistor 432, as represented by the following equation (5):

$$\frac{1}{N} = \frac{R_1}{R_1 + R_2} \qquad (5)$$

The reference voltage generating circuit 440 includes the first control terminal, the second control terminal and an output terminal. The first control terminal of the reference voltage generating circuit 440 is connected in common to the output terminal of the power stage 110, the load 120, and the input terminal of the voltage dividing circuit 430. The second control terminal of the reference voltage generating circuit 440 is connected to the output terminal of the voltage dividing circuit 430. The output terminal of the reference voltage generating circuit 440 is connected to a non-inverted input terminal of the subtractor 450.

The reference voltage generating circuit 440 generates a reference voltage ($V_{ref}$) in accordance with the voltage ($V_{div}$) to be applied to the second control terminal. The reference voltage generating circuit 440 applies the reference voltage ($V_{ref}$) to the non-inverted input terminal of the subtractor 450.

The reference voltage generating circuit 440 selects a first candidate voltage ($V_{ref1}$) as the reference voltage ($V_{ref}$)) in a first phase where the output voltage ($V_{div}$) of the voltage dividing circuit 430 is lower than a second threshold voltage ($V_d$). The first candidate voltage ($V_{ref1}$) is the output voltage ($V_{out}$) of the power stage 110. On the other hand, the reference voltage generating circuit 440 selects a second candidate voltage ($V_{ref2}$) as the reference voltage ($V_{ref}$) in a second phase where the output voltage ($V_{div}$) of the voltage dividing circuit 430 is equal to or greater than the second threshold voltage ($V_d$).

In FIG. 5, the reference voltage generating circuit 440 includes a reference voltage source 442, a switching circuit 443 ($SW_2$), switch 446 ($SW_4$), a resistor 481 ($R_3$), a diode 482 ($D_2$), a comparator 483, and an inverter 484.

The reference voltage source 442 is driven by the output voltage ($V_{out}$) of the power stage 110, and generates the second candidate voltage ($V_{ref2}$) while the switch 446 ($SW_4$) is in the ON state. Specifically, the reference voltage source 442 is implemented by using the BGR circuitry. The second candidate voltage ($V_{ref2}$) has a stable level regardless of change in the output voltage ($V_{out}$) of the power stage 110 in the second phase.

The switching circuit 443 ($SW_2$) selects one of the first candidate voltage ($V_{ref1}$) and the second candidate voltage ($V_{ref2}$) as the reference voltage ($V_{ref}$) depending on the level of the output voltage ($V_{out}$) of the voltage dividing circuit 430. Specifically, the switching circuit 443 ($SW_2$) selects the first candidate voltage ($V_{ref1}$) if the output voltage ($V_{div}$) of the voltage dividing circuit 430 is lower than the second threshold voltage ($V_d$). On the other hand, the switching circuit 443 ($SW_2$) selects the second candidate voltage ($V_{ref2}$) if the output voltage ($V_{div}$) of the voltage dividing circuit 430 is equal to or greater than the second threshold voltage ($V_d$).

The switching circuit 443 ($SW_2$) includes a switch 471 ($SW_{21}$) and a switch 472 ($SW_{22}$).

The switch 471 ($SW_{21}$) includes a control terminal. The output voltage of the inverter 484 is applied to the control terminal of the switch 471 ($SW_{21}$), and the switch 471 ($SW_{21}$) is switched between the ON and OFF states in accordance with the output voltage. Specifically, the switch 471 ($SW_{21}$) short-circuits between the first control terminal of the reference voltage generating circuit 440 and the output terminal of the reference voltage generating circuit 440 in the first phase. On the other hand, the switch 471 ($SW_{21}$) opens between the first control terminal of the reference voltage generating circuit 440 and the output terminal of the reference voltage generating circuit 440 in the second phase. That is, the switch 471 ($SW_{21}$) applies the first candidate voltage ($V_{ref1}$) to the output terminal of the reference voltage generating circuit 440 as the reference voltage ($V_{ref}$) in the first phase.

The switch 472 ($SW_{22}$) includes a control terminal. An output signal of the comparator 483 is input to the control terminal of the switch 472 ($SW_{22}$), and the switch 472 ($SW_{22}$) is switched between the ON and OFF states in accordance with the output signal. Specifically, the switch 472 ($SW_{22}$) opens between the reference voltage source 442 and the output terminal of the reference voltage generating circuit 440 in the first phase. On the other hand, the switch 472 ($SW_{22}$) short-circuits between the reference voltage source 442 and the output terminal of the reference voltage generating circuit 440 in the second phase. That is, the switch 472 ($SW_{22}$) applies the second candidate voltage ($V_{ref2}$) to the output terminal of the reference voltage generating circuit 440 as the reference voltage ($V_{ref}$) in the second phase.

The switch 446 ($SW_4$) includes a control terminal. An output signal of the comparator 483 is input to the control terminal of the switch 446 ($SW_4$), and the switch 446 ($SW_4$) is switched between the ON and OFF states in accordance with the output signal. Specifically, the switch 446 ($SW_4$) opens between the first control terminal of the reference voltage generating circuit 440 and the reference voltage source 442 in the first phase. That is, the switch 446 ($SW_4$) stops supply of a driving voltage to the reference voltage source 442 while the second candidate voltage ($V_{ref2}$) is not selected as the reference voltage ($V_{ref}$). On the other hand, the switch 446 ($SW_4$) short-circuits between the first control terminal of the reference voltage generating circuit 440 and the reference voltage source 442 in the second phase.

The resistor 481 ($R_3$) includes a first terminal and a second terminal. The first terminal of the resistor 481 ($R_3$) is connected to the first control terminal of the reference voltage generating circuit 440. The second terminal of the resistor 481 ($R_3$) is connected to both of an anode of the diode 482 ($D_2$) and an inverted input terminal of the comparator 483.

The diode 482 ($D_2$) includes an anode and a cathode. The anode of the diode 482 ($D_2$) is connected to both of the second terminal of the resistor 481 ($R_3$) and the inverted input terminal of the comparator 483. The cathode of the diode 482 ($D_2$) is grounded. That is, the resistor 481 ($R_3$) and the diode 482 ($D_2$) are connected in series.

The voltage of the second terminal of the resistor 481 ($R_3$) and that of the anode of the diode 482 ($D_2$) are used as the second threshold voltage ($V_d$). While the diode 482 ($D_2$) is in the OFF state, a current does not flow into the resistor 481 ($R_3$). In this case, the second threshold voltage ($V_d$) is equal to the output voltage ($V_{out}$) of the power stage 110. While the diode 482 ($D_2$) is in the ON state, a current flows into the resistor 481 ($R_3$). In this case, the second threshold voltage ($V_d$) becomes lower than the output voltage ($V_{out}$) of the power stage 110. Specifically, if the output voltage ($V_{out}$) of the power stage 110 is equal to or greater than a forward voltage ($V_f$) of the diode 482 ($D_2$), the second threshold voltage ($V_d$) is generally set to be the same as the forward voltage ($V_f$).

Figure 6:
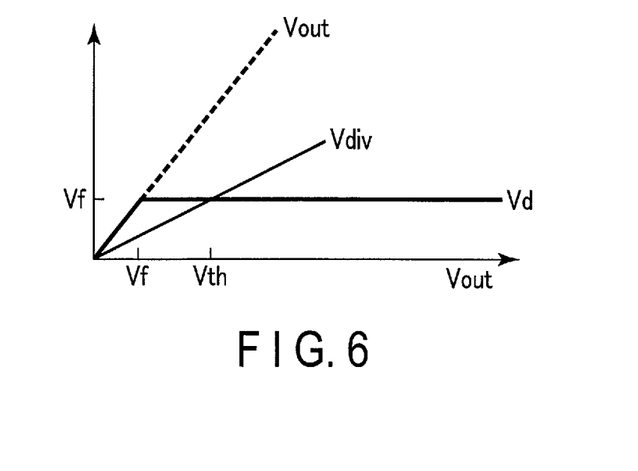
FIG. 6 is a graph illustrating a voltage of each node shown in FIG. 5.

The second threshold voltage ($V_d$) is represented by equation (6) and FIG. 6.

$$\begin{cases} V_d = V_{out} & \text{if } V_{out} < V_f \\ V_d \approx V_f & \text{if } V_{out} \geq V_f \end{cases} \quad (6)$$

The comparator 483 includes a non-inverted input terminal, inverted input terminal, and output terminal. The non-inverted input terminal of the comparator 483 is connected to the output terminal of the voltage dividing circuit 430. The inverted input terminal of the comparator 483 is connected to both of the second terminal of the resistor 481 ($R_3$) and the anode of the diode 482 ($D_2$). The output terminal of the comparator 483 is connected to the control terminal of the switch 446 and the input terminal of the inverter 484.

The comparator 483 compares the voltage ($V_{div}$) of the non-inverted input terminal and the voltage ($V_d$) of the inverted input terminal. The comparator 483 generates an output signal corresponding to a high-level digital signal if the voltage ($V_{div}$) of the non-inverted input terminal is equal to or greater than the voltage ($V_d$) of the inverted input terminal. On the other hand, the comparator 483 generates an output signal corresponding to a low-level digital signal if the voltage ($V_{div}$) of the non-inverted input terminal is lower than the voltage ($V_d$) of the inverted input terminal.

In other words, if $V_{out} < V_f$, $V_{out}/N = V_{div} < V_d = V_{out}$. In addition, even if $V_{out} \geq V_f$, if the level of the output voltage ($V_{out}$) of the power stage 110 is relatively low, there may be the case where $V_{out}/N = V_{div} < V_d \approx V$ is true. In such a case, since the level of the output signal of the comparator 483 is low, the first candidate voltage ($V_{ref1}$) is used as the reference voltage ($V_{ref}$).

On the other hand, if $V_{out} \geq V_f$ and the level of the output voltage ($V_{out}$) of the power stage 110 is relatively high, $V_f \approx V_d \leq V_{div} = V_{out}/N$. In such a case, since the level of the output signal of the comparator 483 is high, the second candidate voltage ($V_{ref2}$) is used as the reference voltage ($V_{ref}$). The level ($\approx NV_f$) of output voltage ($V_{out}$) of the power stage 110 when $V_{out}/N = V_{div} = V_d \approx V_f$ is true can be regarded as the first threshold voltage ($V_{th}$).

Figure 7:
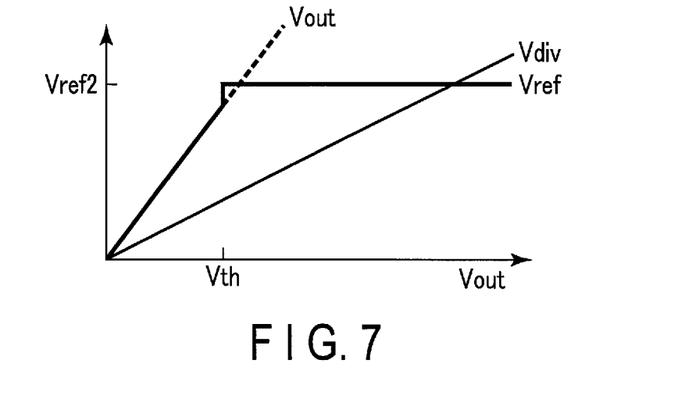
FIG. 7 is a graph illustrating a voltage of each node shown in FIG. 5.

FIG. 7 shows the relation between the output voltage ($V_{out}$) of the power stage 110 and the reference voltage ($V_{ref}$). When the output voltage ($V_{out}$) of the power stage 110 is considerably lower than the first threshold voltage ($V_{th}$), the reference voltage source 442 cannot operate normally, and the level of the second candidate voltage ($V_{ref2}$) is extremely low. If the second candidate voltage ($V_{ref2}$) the level of which is extremely low is used as the reference voltage ($V_{ref}$) the condition of $V_{ref} \leq V_{div}$ is always true, and the output voltage ($V_{out}$) of the power stage 110 cannot increase to a desired level.

Accordingly, the reference voltage generating circuit 440 selects the first candidate voltage ($V_{ref1}$) as the reference voltage ($V_{ref}$) in the first phase where the output voltage ($V_{div}$) of the voltage dividing circuit 430 is lower than the second threshold voltage ($V_d$), as stated above. The first candidate voltage ($V_{ref1}$) is set to be equal to or greater than the output voltage ($V_{div}$) of the voltage dividing circuit 430 in the first phase. In this case, if the first candidate voltage ($V_{ref1}$) is used as the reference voltage ($V_{ref}$), the output voltage ($V_{out}$) of the power stage 110 can increase to a level sufficient for the reference voltage source 442 to operate normally.

In addition, as stated above, the second candidate voltage ($V_{ref2}$) is selected as the reference voltage ($V_{ref}$) in the second phase where the output voltage ($V_{div}$) of the voltage dividing circuit 430 is equal to or greater than the second threshold voltage ($V_d$). The second candidate voltage ($V_{ref2}$) has a stable level regardless of change in the output voltage ($V_{out}$) of the power stage 110 in the second phase. Accordingly, output voltage ($V_{out}$) of the power stage 110 can be stabilized through the negative feedback control.

The inverter 484 includes an input terminal and an output terminal. The input terminal of the inverter 484 is connected to a control terminal of the reference voltage generating circuit 440. The output terminal of the inverter 484 is connected to a control terminal of the switch 471 ($SW_{21}$). The inverter 484 performs logical inversion on an output signal of the comparator 483.

The subtractor 450 includes the non-inverted input terminal, inverted input terminal, and output terminal. The non-inverted input terminal of the subtractor 450 is connected to the output terminal of the reference voltage generating circuit 440. The inverted input terminal of the subtractor 450 is connected to the output terminal of the voltage dividing circuit 430. The output terminal of the subtractor 450 is connected to the input terminal of the switching control circuit 460.

The subtractor 450 subtracts the voltage of the inverted input terminal ($V_{div}$) from the voltage of the non-inverted input terminal ($V_{ref}$). The subtractor 450 outputs a difference signal indicating a sign (positive or negative) of a differential voltage to the switching control circuit 460.

Specifically, the subtractor 450 is implemented by a comparator. The subtractor 450 outputs a difference signal ($V_{CMP}$) corresponding to a high-level digital signal to the switching control circuit 460 when a differential voltage shows a positive sign. On the other hand, the subtractor 450 outputs a difference signal ($V_{CMP}$) corresponding to a low-level digital signal to the switching control circuit 460 when the differential voltage shows a negative sign.

The switching control circuit 460 includes the input terminal and the output terminal. The input terminal of the switching control circuit 460 is connected to the output terminal of the subtractor 450. The output terminal of the switching control circuit 460 is connected to the control terminal of the power stage 110. The switching control circuit 460 is implemented by using a Constant On circuit, for example.

Figure 8:
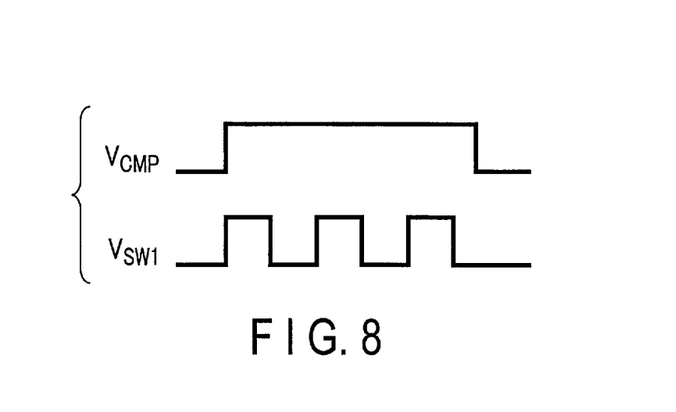
FIG. 8 is a time-chart illustrating input and output signals of a switch control circuit shown in FIG. 5.

The switching control circuit 460 receives a difference signal ($V_{CMP}$) from the subtractor 450. The switching control circuit 460 generates a switching control signal based on the difference signal ($V_{CMP}$). The switching control circuit 460 outputs the switching control signal to the power stage 110. Specifically, if the level of the difference signal ($V_{CMP}$) is high, the switching control circuit 460 generates a switching control signal ($V_{SW1}$) to periodically switch ON and OFF states of the switch 112 ($SW_1$). As shown in FIG. 8, a switching control signal ($V_{SW1}$) corresponding to a pulse signal having predetermined ON periods and OFF periods is generated. This switching control signal ($V_{SW1}$) increases the output voltage ($V_{out}$) of the power stage 110. On the other hand, if the level of the difference signal ($V_{CMP}$) is low, the switching control circuit 460 generates a switching control signal ($V_{SW1}$) so that the switch 112 ($SW_1$) remains in the OFF state. This switching control signal ($V_{SW1}$) decreases the output voltage ($V_{out}$) of the power stage 110.

As stated above, the DC-to-DC converter according to the fourth embodiment adaptively selects a reference voltage from among a plurality of candidate voltages having different characteristics. This DC-to-DC converter ensures stable operation even if the level of DC output voltage is minute.

In addition, the DC-to-DC converter stops supply of a driving voltage to a specific candidate voltage while the specific candidate voltage is not selected as a reference voltage. Accordingly, this DC-to-DC converter reduces unnecessary current consumption in the reference voltage source to generate candidate voltages. That is, this DC-to-DC converter reduces current consumption and achieves high speed charging for a capacitor included in the power stage.

Furthermore, the DC-to-DC converter uses the output voltage of the DC-to-DC converter as a specific candidate voltage. This DC-to-DC converter eliminates the need for providing a reference voltage source to generate the specific candidate voltage, thereby achieving simplification of the configuration and reduction of current consumption.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A direct current to direct current (DC-to-DC) converter comprising:
   a power stage that converts an input voltage to a first output voltage;
   a generating circuit that generates a reference voltage by selecting one of candidate voltages in accordance with a level of the first output voltage;

a voltage dividing circuit that divides the first output voltage to obtain a second output voltage;

a subtractor that calculates a differential voltage between the reference voltage and the second output voltage; and a control circuit that generates a control signal to control the level of the first output voltage based on the differential voltage.

2. The converter according to claim 1, wherein the candidate voltages include a first candidate voltage and a second candidate voltage, and the generating circuit selects the first candidate voltage when the first output voltage is lower than a first threshold voltage, and selects the second candidate voltage when the first output voltage is equal to or greater than the first threshold voltage.

3. The converter according to claim 2, wherein the generating circuit includes a voltage source that is driven by the first output voltage to generate the second candidate voltage, and the voltage source includes a band gap reference (BGR) circuit.

4. The converter according to claim 3, wherein the voltage source stops operation while the first output voltage is lower than the first threshold voltage.

5. The converter according to claim 2, wherein the generating circuit uses the first output voltage as the first candidate voltage.

6. The converter according to claim 1, wherein the generating circuit includes a diode, the candidate voltages include a first candidate voltage and a second candidate voltage, and the generating circuit selects the first candidate voltage when the second output voltage is lower than a second threshold voltage dependent on the first output voltage and a forward voltage of the diode, and selects the second candidate voltage when the second output voltage is equal to or greater than the second threshold voltage.

7. A direct current to direct current (DC-to-DC) converter comprising:

a power stage that converts an input voltage to an output voltage;

a generating circuit that generates a reference voltage by selecting one of candidate voltages in accordance with a level of the output voltage;

a subtractor that calculates a differential voltage between the reference voltage and the output voltage; and a control circuit that generates a control signal to control the level of the output voltage based on the differential voltage.

8. The converter according to claim 7, wherein the candidate voltages include a first candidate voltage and a second candidate voltage, and the generating circuit selects the first candidate voltage when the output voltage is lower than a first threshold voltage, and selects the second candidate voltage when the output voltage is equal to or greater than the first threshold voltage.

9. The converter according to claim 8, wherein the generating circuit includes a voltage source that is driven by the output voltage to generate the second candidate voltage, and the voltage source includes a band gap reference (BGR) circuit.

10. The converter according to claim 9, wherein the voltage source stops operation while the output voltage is lower than the first threshold voltage.

11. The converter according to claim 8, wherein the generating circuit uses the output voltage as the first candidate voltage.

* * * * *